United States Patent [19]
Mendolia

[11] Patent Number: 5,838,789
[45] Date of Patent: Nov. 17, 1998

[54] S-SHAPED FLIP CELLULAR TELEPHONE

[75] Inventor: Gregory S. Mendolia, Forest, Va.

[73] Assignee: Ericsson Inc., Triangle Park, N.C.

[21] Appl. No.: 777,431

[22] Filed: Dec. 30, 1996

[51] Int. Cl.$^6$ ................................................ H04M 1/00
[52] U.S. Cl. ......................................... 379/433; 379/434
[58] Field of Search ................................. 379/433, 434, 379/428; 455/90, 575

[56] References Cited

U.S. PATENT DOCUMENTS 5,404,390  4/1995  Tamura ................................... 379/433

Primary Examiner—Jack Chiang
Attorney, Agent, or Firm—Burns, Doane, Swecker & Mathis, L.L.P.

[57] ABSTRACT

A cellular telephone for improved transmission includes a housing body that is shaped with a curvature so that a front face of the body is convex. A flip pivotally mounted to a bottom end of the body is correspondingly shaped so that the flip is pivotable between a closed position covering the front face, and an open position extended from the body. An antenna is mounted to the top end of the body and extends therefrom. When the flip is in the open position, the body and flip define an S-shaped profile which results in the antenna being spaced away from and oriented away from the user which avoids interference with the user for better transmission.

11 Claims, 2 Drawing Sheets

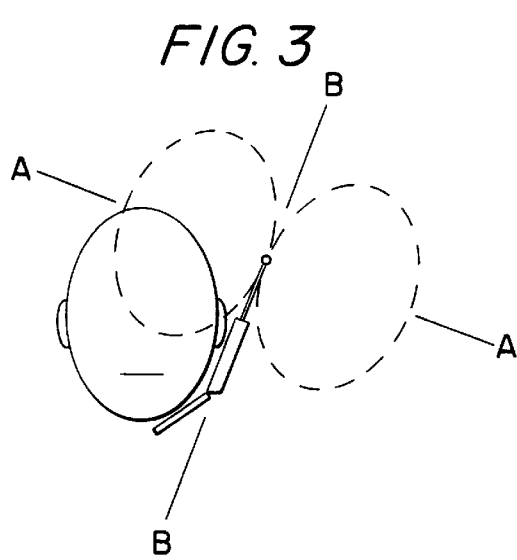
FIG. 3
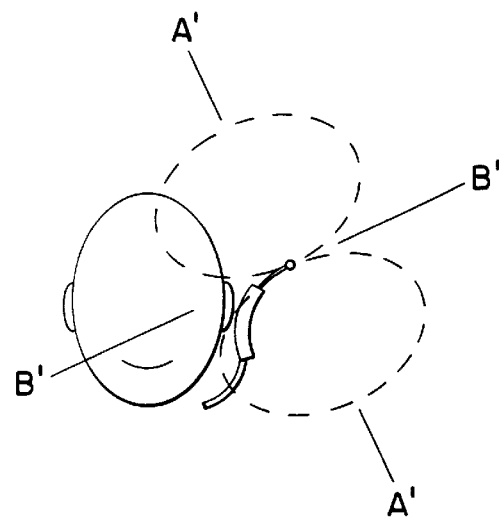
FIG. 4
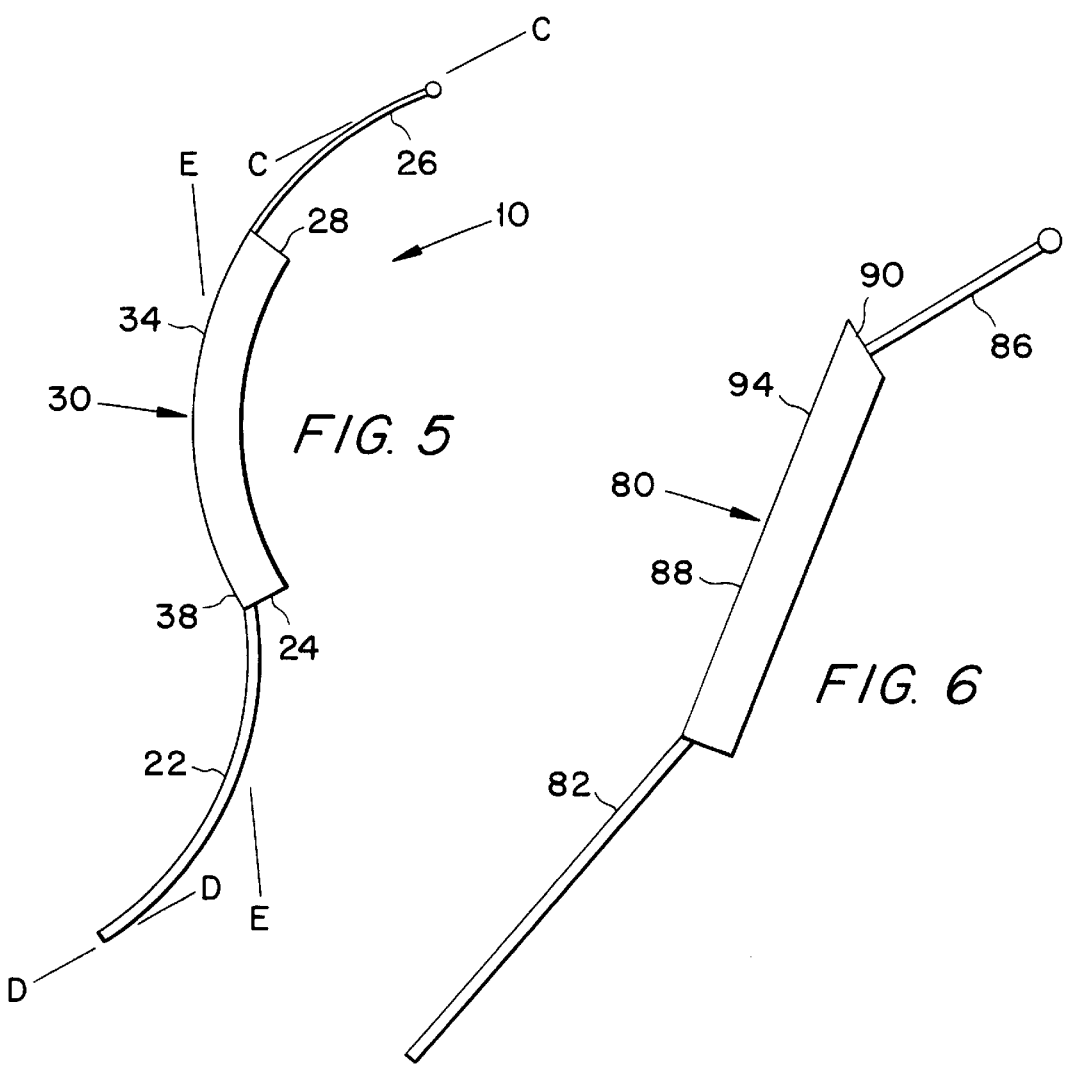
FIG. 5
FIG. 6

S-SHAPED FLIP CELLULAR TELEPHONE

The present invention is directed to a cellular telephone. More particularly, the invention is directed to a cellular flip telephone body and antenna mounting.

BACKGROUND AND SUMMARY

Cellular telephones, because of their increasing popularity, have been subject to much design work, aimed at improvements in convenience and ease of use. One area receiving much attention is in reducing the size of the telephone unit, making it both lighter in weight and smaller for ease in carrying the unit. Some cellular telephone units now available are less than the size of a human hand and can fit easily in a pocket.

Decreasing the size of cellular telephone units has created a problem in the transmission of these smaller units, related to the antenna pattern and optimum transmit power of the unit. The smaller size of contemporary cellular telephone units has placed the high impedance portion of the antenna (referred to as the "hot spot" and located typically at the free end of the antenna) close to the user's head. The radiation pattern is thus generated near the user's head, which can act as a barrier to transmission by blocking and/or absorbing the radiant energy emitted from the antenna. This is most noticeable, and of particular concern, when the unit is used in cell fringe areas farthest from the relay station. Also, the problem is exacerbated in cellular telephones having retractable antennas: when a retractable antenna is in the retracted position, the hot spot, and radiation pattern, is even closer to the user's head than when the antenna is in the normal position.

An available cellular flip telephone that addresses this area has a main body with an antenna projecting from a top end, and a flip containing the earpiece also mounted to the top end. Conventional flip telephones have the flip mounted to the bottom end of the body, opposite the antenna. The flip of this telephone pivots toward the antenna, and thus, when in an open position, the flip is between the antenna and the user's head. The antenna projects from the main portion away from the user's head. This unit, however, positions the antenna lower relative to the user's head, compared to other designs, and, because of the short length of the main body, does not provide much to space the antenna hot spot from the user.

The present invention provides a cellular telephone having means for positioning the antenna relative to a user for improved transmission and reception.

More particularly, a cellular telephone according to the invention includes a body portion having a top end and an antenna mounted to the top end, the body being shaped so that the antenna diverges away from a front side of the body, thus positioning the antenna higher and farther away from the user's head. The diverging antenna position improves the transmission from the antenna.

A cellular telephone in accordance with the invention includes a body having a front side that carries the components for the user, the earpiece, microphone, keypad, and display panel. The body may be advantageously formed of a front shell and back shell that are fastened together to define an interior space for the electronic components.

According to one aspect of the invention, the top end portion of the body is bent to diverge away from a plane defined by the front side of the body or by particular component locations on the front side. The diverging orientation of the antenna results in a rotation of the transmission radiation pattern, relative to conventional designs, which causes less of the transmission pattern to be blocked by the user.

In a preferred embodiment, the display panel is disposed in the top end portion of the front side proximate the top end, and the earpiece is disposed adjacent the display panel between the display panel and a bottom end of the unit. Thus, when the earpiece is positioned at the user's ear, the top end portion including the antenna, is spaced away from the user's head, providing clearance distance between the user and the antenna's hot spot, and thus improving the transmission of the telephone.

According to one embodiment, the body is substantially planar between a bottom end and an earpiece mounting location near the top end. This shape facilitates fitting a planar printed circuit board in the body. A bend is formed in the body proximate the ear piece mounting location so that the portion between the ear piece mounting location and the top end is at an oblique angle to the plane defined by the planar portion. According to a preferred embodiment, the angle is in a range of about 30° to 60°. The display panel is disposed in this top end portion. The antenna thus extends away from the body of the telephone and at a maximal distance away from the user's head.

According to another embodiment, the body is shaped with a convex curvature on the front side, so that the top end portion, including the antenna, curves away from the front side, thus positioning the antenna at a maximal distance away from the user's head. A radius of curvature for the body is selected to position the antenna at a maximal distance while also positioning the earpiece and microphone for use. A preferred radius of curvature is in a range of about 8 to 12 centimeters.

According to another aspect of the invention, the antenna may be either formed straight, or curved and positioned with the convex side aligned with the front side of the body.

According to another embodiment of the invention, the top end panel of the body itself may be set at an angle to the front face of the unit, so that the antenna mounted on the top end panel is directed to diverge from the front face. Alternatively, the antenna may be mounted to the top end of the unit with an angled mounting device, so that only the antenna itself is disposed at an angle to the front face of the unit. According to a preferred embodiment, the angle for the top end panel or the antenna mounting device is selected to be within a range of about 30° to 60°.

According to yet another aspect of the invention, the telephone unit includes a flip portion that is pivotally mounted to a bottom end of the body. The flip has a closed position in which it covers at least a portion of the front side of the body, and an open position in which it extends substantially in longitudinal alignment with the body. The flip portion may be formed to cover the entire front side of the body, or only a portion, for example the keypad, or the keypad and earpiece.

In the embodiment in which the body portion is curved, the flip is shaped with a corresponding curvature to mate with the front side of the body when in the closed position. When in the open position, the flip and the body portion define a S-shaped profile which positions the antenna at an angle directed away from the front side and user's head. A free end portion of the flip curves toward the plane defined by the front side of the telephone, and is positioned toward the user's mouth. The free end portion of the flip defines a plane that is parallel to a line defined by the antenna.

In the embodiment in which the body portion is planar in a portion between the earpiece mounting means and the bottom of the body, the flip is shaped to have a bent portion proximate a free end, and to be substantially planar from the bent portion to a pivot mounting end.

BRIEF DESCRIPTION OF THE DRAWINGS

The invention will be better understood by reference to the following description in connection with the appended drawings, in which:

FIG. 3 is a representation of radiation pattern of a convention telephone with a user;

FIG. 4 is a representation of a radiation pattern of a cellular telephone according to the invention and a user;

FIG. 5 is a side view of the cellular telephone of FIG. 1; and,

FIG. 6 is a perspective view of another alternative embodiment of a cellular telephone in accordance with the invention.

DETAILED DESCRIPTION

Figures 1, 2:
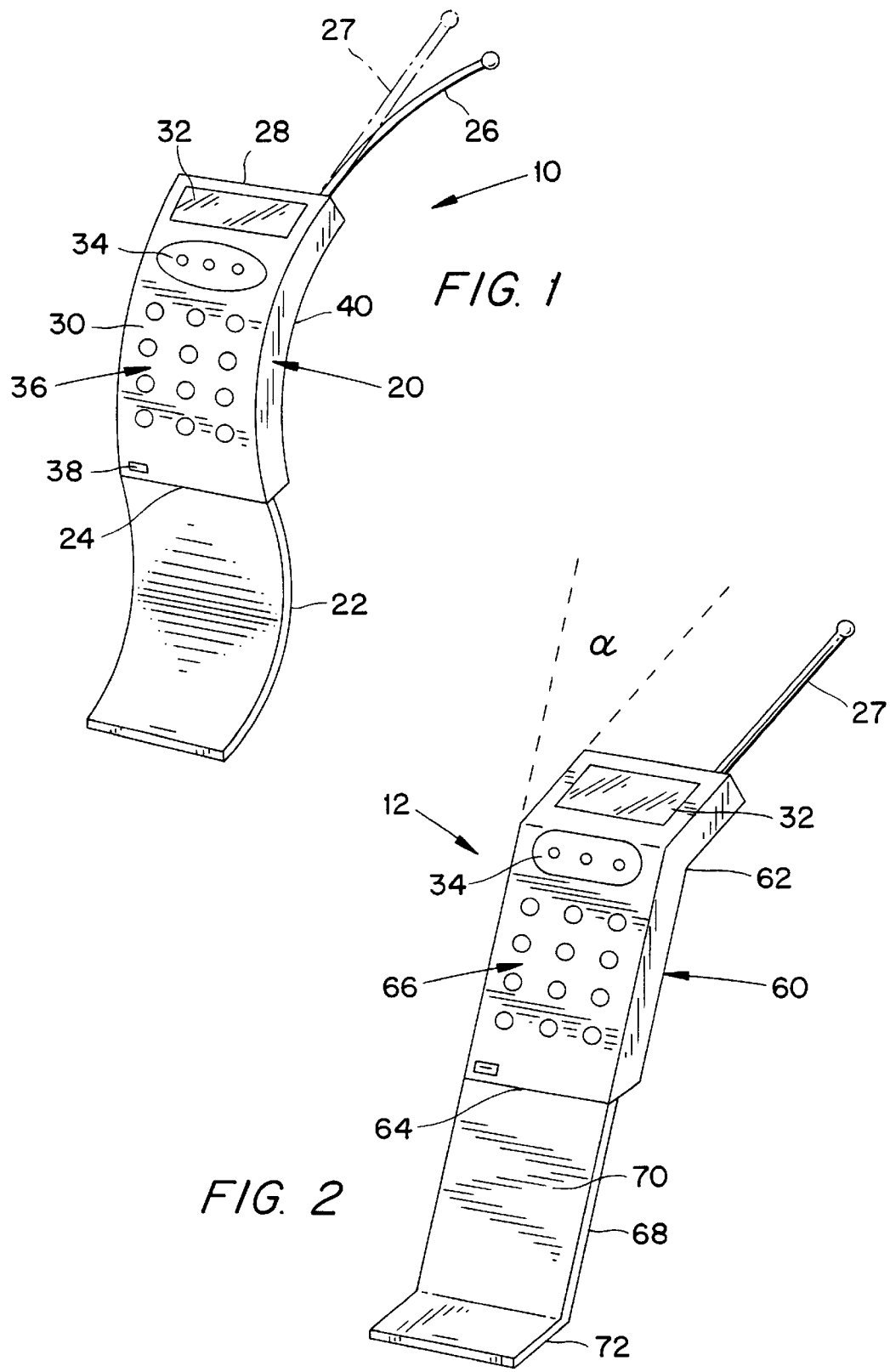
FIG. 1 is a perspective view of a cellular telephone in accordance with the invention.
FIG. 2 is a perspective view of a cellular telephone of the invention according to another embodiment of the invention.

A cellular telephone 10 in accordance with the invention is shown in perspective view in FIG. 1. The telephone 10 includes a main body 20, a flip 22 pivotally mounted to a bottom end 24 of the body, and an antenna 26 mounted to a top end 28 of the body. A front side 30 of the body provides mounting locations for a display panel 32 proximate the top end 28, an earpiece 34 adjacent the display panel at a top central portion, a keypad 36 at a lower central portion, and a microphone 38 proximate the bottom end 24.

The main body 20 may conveniently be formed from two shells fastened together to form an enclosure for the components of the telephone, for example, a printed circuit board, and the main portions of the earpiece, microphone, keyboard and display unit.

The flip 22 is pivotable between an open position, shown in FIG. 1, in which the flip is extended from and substantially longitudinally aligned with the body 20, and a closed position, not illustrated, but easily understood, in which the flip covers at least a portion of the front side 30 of the body. The flip 22 shown in FIG. 1 has a length sufficient to cover the entire front side 30. Alternatively, the flip may be formed with a length to cover only the keypad 36, or the keypad and earpiece 34, leaving the display panel 32 uncovered and visible when the flip is in the closed position.

The body 20 is shaped so that at least the front side 30 has a convex curvature, as shown in FIG. 1. As may be seen, this causes the top end portion including the antenna 26 to diverge in the direction of the back face 40 away from the front side 30. This feature of the invention advantageously positions the antenna at a distance from the user's head, which improves the transmission of the unit, as explained below in connection with FIGS. 3 and 4. The curvature is selected to position the antenna 26 an optimal distance away from the user's head, without harming the functionality of the front panel of the telephone, that is, the earpiece and microphone remain in convenient position for the user. According to a preferred embodiment, a radius of curvature of about 8 to 12 cm would be effective for the body curvature.

It is not necessary functionally that the back face 40 have a matching concave curvature. Alternatively, the back face 40 could be planar to provide mounting space for a printed circuit board, or another convenient shape to fit a user's hand.

The flip 22 is shaped with a curvature for mating with the front side 30 when the flip is in the closed position. The shape and curvature of the flip 22 is, of course, adapted for the length of the flip.

The antenna 26 is also provided with a curvature consistent with the curvature of the front side 30, that is, lying on a curve defined by continuing the curvature of the front side. Alternatively, the antenna may be straight, as shown by the broken line antenna 27. The antenna 26 (or 27) may be a fixed length, or telescoping type antenna.

FIG. 3 is a representation of a transmission radiation pattern of a conventional cellular telephone 100 relative to a user's head 120 when the telephone is held in a typical position for use. FIG. 4 shows a transmission pattern for a telephone in accordance with the invention. FIG. 3 and FIG. 4 are not intended to represent with precision the size of the radiation pattern or the degree to which the radiation pattern is affected by the user's head, but are intended to show relative differences in the position of a radiation pattern for different telephone configurations. In FIG. 3, the telephone 100, as is conventional in the industry, includes an earpiece located at the upper end portion, near the antenna 104. When the earpiece is position at the user's ear, the antenna 104 is near the user' head. The maximum radiation, indicated by the line A—A, coincides to a large degree with the user's head, thus, the head may block or absorb radiant energy, and interfere with the transmission.

FIG. 4 is a representation of a radiation pattern for a telephone in accordance with the invention, in particular, the telephone 10 of FIG. 1. As may be seen, shaping the top end of the telephone 10 and thus the antenna 26 to diverge away from the front side of the telephone, the antenna is both positioned away from and oriented away from the user's head. This provides both space between the user's head and the antenna, and an antenna orientation relative to the head so that the maximum radiation pattern A'—A' coincides primarily with free space and therefore to a much lesser degree with the user.

The orientation of the antenna 26 rotates the radiation pattern relative to the user so that the null portion B'—B' of the radiation pattern is advantageously positioned toward the user. The relative orientation of the antenna away from the front side of the telephone eliminates the need to extend the length of the telephone body to position the antenna farther from the user. The telephone unit 10 may thus maintain a small size, as is commercially desirable, yet also avoid much of the interference with the user found in conventional units.

As may be seen in FIG. 1, the curved body telephone assumes an S-shaped profile when the flip 22 is in the open position. As better seen in FIG. 5, the telephone of FIG. 1 is shown in side view in the open position, that is, with the flip 22 extended from the body 20. The antenna 26 is at an oblique angle to a plane E—E defined by the earpiece mounting location 34 and the microphone mounting location 38. It may be seen that the top end portion, that is, from the top end 28 to about the ear piece mounting location 34, also diverges from the plane E—E. Also, a line C—C defined by a tangent to an end portion of the antenna 26 is substantially parallel to a line D—D defined by at tangent to an end portion of the flip 22. This orientation helps ensure that the antenna 26 to be positioned directed away from the user's head for improved transmission.

FIG. 2 illustrates a cellular telephone 12 according to an alternative embodiment of the invention. In this embodiment, the portion of the body from the earpiece mounting 34 to the bottom end 64 is substantially planar. The body 60 of the telephone has a bend 62 located between the display panel mounting location 32 and the earpiece mounting location 34. The bend 62 directs the top end portion of the body to diverge from the plane defined by the planar portion. The antenna 27 which extends from the top end, is therefore also at an angle to the plane defined by the planar portion, and is thus positioned away from and angled from the front side 66 of the telephone 12. According to a preferred embodiment, an angle ∝ in a range of about 30° to 60° is sufficient for positioning the antenna.

The flip 68 is pivotally mounted to the bottom end 64 of the body 60. The flip 68 is pivotable between an open position, shown in FIG. 2, and a closed position covering at least a portion of the front side 66. The flip 68 is shaped with a substantially planar portion 70 and a free end portion 72 bent to conform with the bent top end portion of the body 60.

The angled free end portion of the flip 72, which is positioned by the user at the user's mouth, is substantially parallel to the antenna 27, which, as described above in connection with FIG. 5, helps ensure that the user will optimally position the antenna 27 when using the telephone 12.

A telephone in accordance with the invention may alternatively be shaped as shown in the embodiment in FIG. 6. The telephone 14 in FIG. 6 is formed with a conventional flat body 80 and flip 82. Antenna mounting means 84 sets the antenna 86 at an angle to the front face 88 of the body 80, to provide the spacing distance and orientation for advantageous transmission, as described above. The antenna mounting means 84 may be provided by forming the top panel 90 at an oblique angle to the front face 88 of the telephone body 80, shown in FIG. 6. In the embodiment of FIG. 6, it is preferable to place the display panel 94 adjacent to the top end panel 90, and the earpiece adjacent to the display panel toward the bottom end of the unit to obtain the advantageous spacing positioning and orientation of the antenna. Similar to the embodiment of FIG. 2, an angle in a range of about 30° to 60° would be sufficient.

The invention has been described in terms of preferred principles, function and structure; however, the illustrative embodiments described are not meant to limit the invention. Rather, those skilled in the art will understand that the invention may be practiced other than as described, and that changes and substitutions may be made without departing from the scope of the invention as defined in the appended claims.

I claim:

1. A cellular telephone, comprising:
   a body having a front side and a top end and a bottom end;
   display panel mounting means on the front side adjacent the top end;
   ear piece mounting means on the front side of the body between the display panel mounting means and the bottom end;
   microphone mounting means on the body proximate the bottom end;
   an antenna mounted in the body and extending from a top end portion of the body;
   wherein, the body is shaped at least at the top end portion so that the antenna diverges at an oblique angle from a plane defined by the ear piece mounting means and the microphone mounting means.

2. The cellular telephone as claimed in claim 1, wherein the front side is shaped with a convex curvature from the top end to the bottom end.

3. The cellular telephone as claimed in claim 2, further comprising a flip portion pivotally mounted to the bottom end of the body, the flip portion being pivotable between a closed position covering at least a portion of the front side of the body and an open position extending substantially in longitudinal alignment with the body, the flip portion being shaped with a curvature corresponding to the shape on the front side of the body, wherein the body and flip define an S-shaped profile when the flip is in the open position.

4. The cellular telephone as claimed in claim 3, wherein the antenna is shaped with a curvature that is convex toward the front side of the body.

5. The cellular telephone as claimed in claim 3, wherein when the flip is in the open position, a free end portion of the flip defines a plane that is parallel to a line defined by the antenna.

6. The cellular telephone as claimed in claim 1, wherein a lower portion of the body from the ear piece mounting means to the bottom end is substantially planar, and an upper portion of the body from the ear piece mounting means to the top end at an oblique angle to the planar lower portion.

7. The cellular telephone as claimed in claim 6, further comprising a flip portion pivotally mounted to the bottom end of the body, the flip have a planar first portion extending from the pivot and a free end portion at an oblique angle to the planar first portion, wherein the flip corresponds in shape to the front side of the body.

8. A cellular telephone, comprising:
   a body having a front side, and having a top end and a bottom end;
   ear piece mounting means on the front side of the body proximate the top end;
   microphone mounting means in the body proximate the bottom end;
   a flip portion pivotally mounted to the bottom end of the body, the flip portion being pivotable between a closed position covering at least a portion of the front side of the body and an open position extending substantially in longitudinal alignment with the body;
   an antenna mounted in the body and extending from the top end of the body;
   wherein, the body is shaped with a convex curvature on the front side, and the flip portion is shaped with a concave curvature on a side that contacts the front side of the body in the closed position so that in an open position the body and flip portion define an S-shaped profile and the antenna projects away from the front of the body.

9. The cellular telephone as claimed in claim 8, wherein the antenna has a curvature shaped to lie in a curve defined by the front side.

10. The cellular telephone as claimed in claim 8, wherein a line defined by the antenna is parallel to a plane defined by a free end portion of the flip.

11. The cellular telephone as claimed in claim 8, further comprising display panel mounting means in the front side adjacent the earpiece mounting means and between the earpiece mounting means and the top end.

* * * * *